Sept. 21, 1971  L. F. CARRIERI ETAL  3,606,641
INJECTION MOLDING MACHINE
Filed June 6, 1969  4 Sheets-Sheet 2

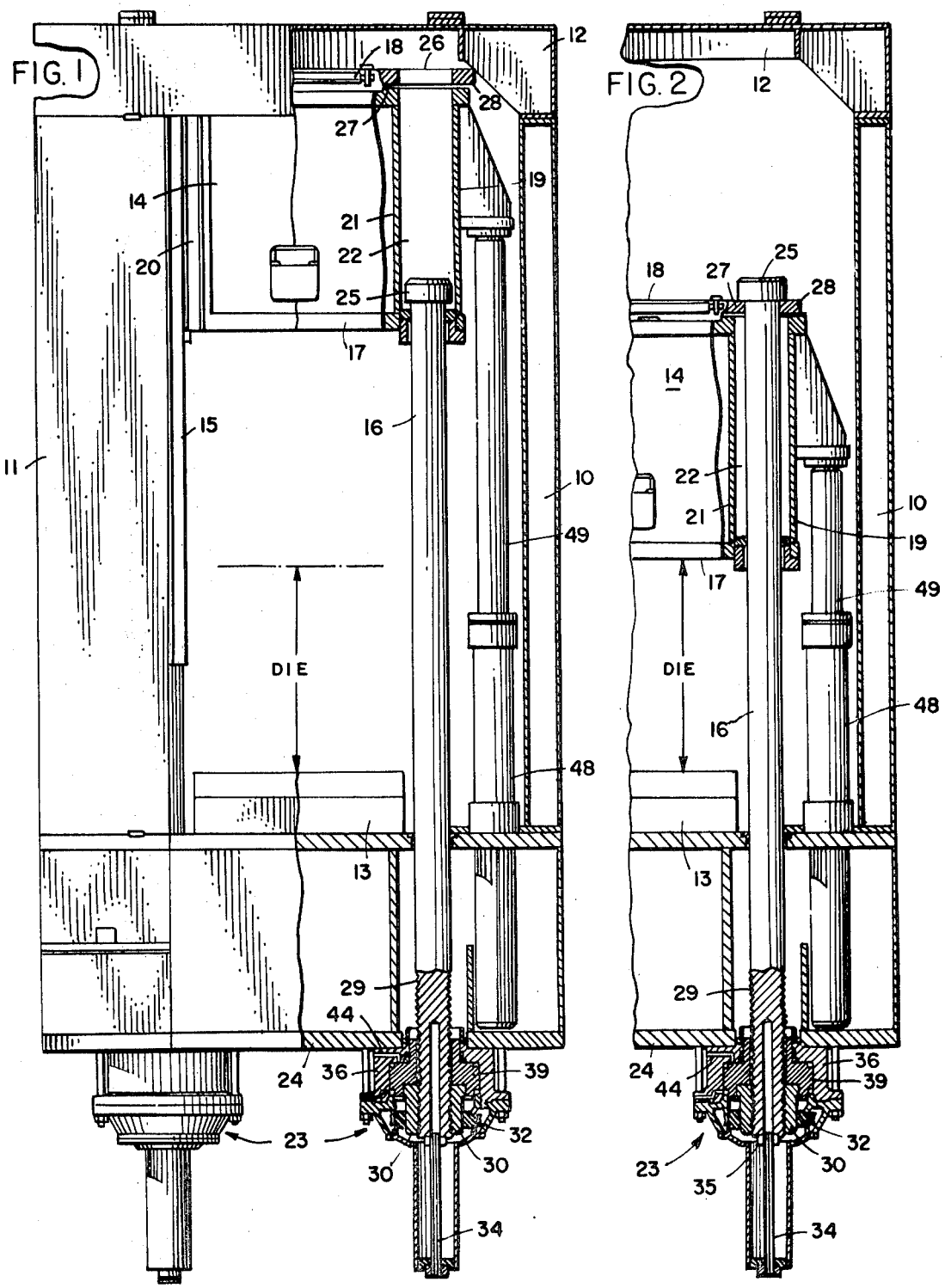

INVENTORS:
LOUIS F. CARRIERI
NORTON D. SKINNER
BY: Johnston, Root, O'Keeffe, Keil, Thompson & Shurtleff
ATT'YS

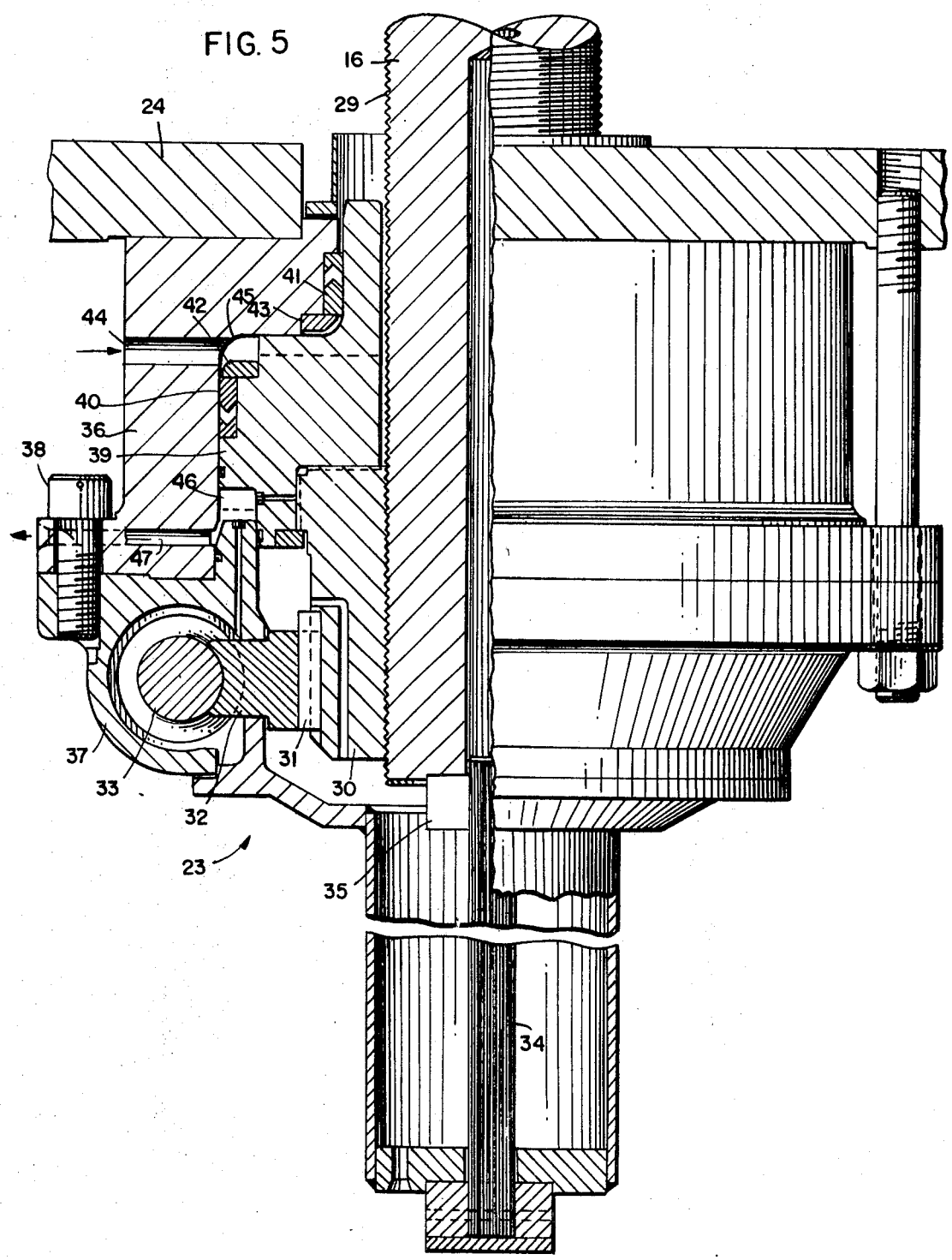

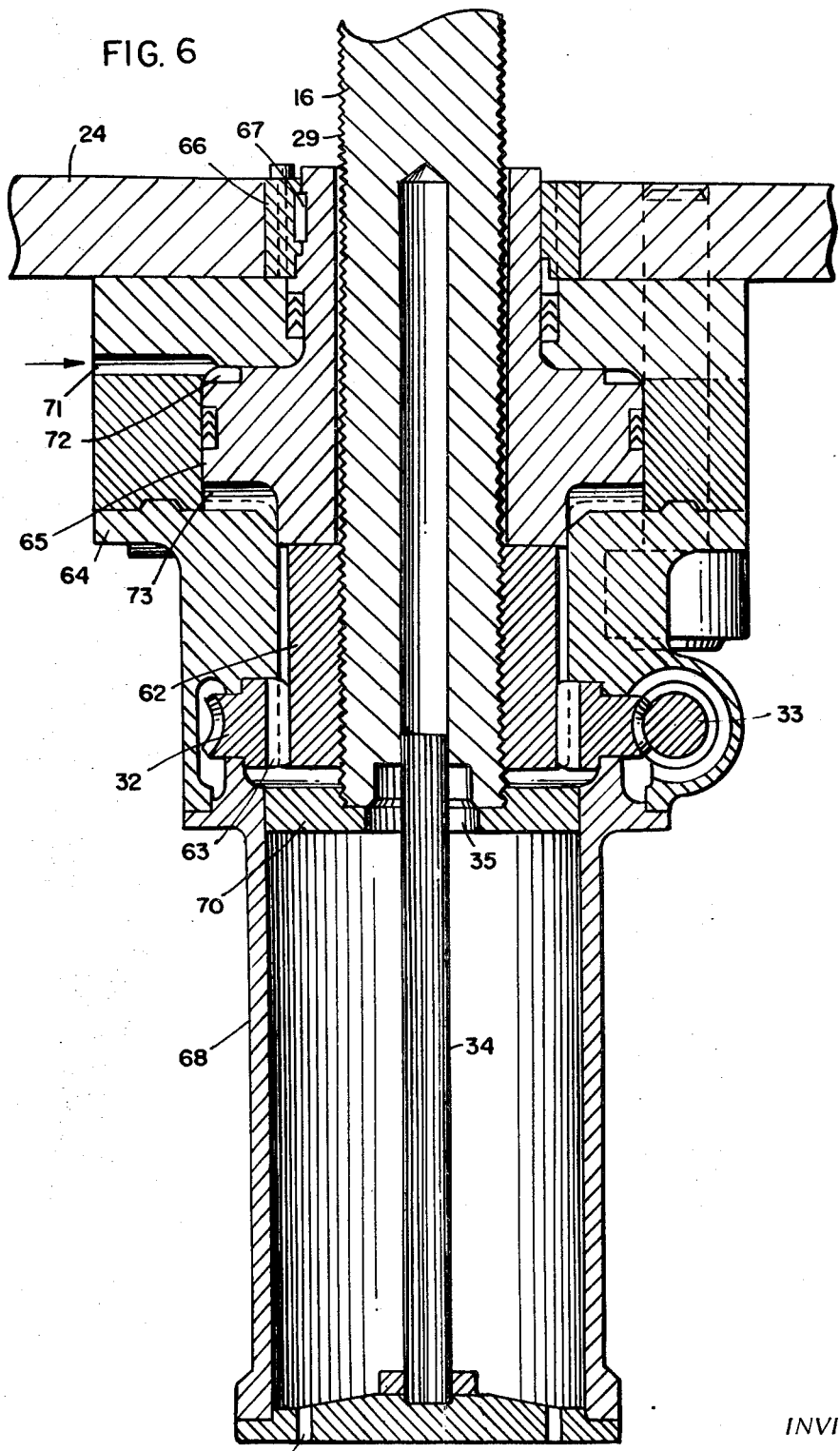

United States Patent Office 3,606,641
Patented Sept. 21, 1971

3,606,641
INJECTION MOLDING MACHINE
Louis F. Carrieri, La Grange Park, and Norton D. Skinner, Palos Heights, Ill., assignors to U.S. Industries, Inc., New York, N.Y.
Filed June 6, 1969, Ser. No. 831,098
Int. Cl. B29f 1/00
U.S. Cl. 18—30LV                6 Claims

ABSTRACT OF THE DISCLOSURE

A vertical injection molding machine where the upper die member is held in the upper position by hydraulic pressure which, when relieved, allows the die member to move downwardly by gravity into contact with the lower die member. Fixed tension rods are secured at their lower ends to clamping units and extend at their upper ends into cavities in the upper slide. The slide and die move downwardly with respect to the tension rods and when the two dies are in contact with each other they become locked with the tension rods. Hydraulic fluid under pressure is then introduced into the clamping units at the bottom of the press, thereby exerting pressure downwardly on the tension rods and upwardly on the press bed, thus clamping the upper and lower die members together during the injection process.

BRIEF SUMMARY OF THE INVENTION

The vertical injection molding machine of the present invention is designed as an improvement over our earlier filed copending application, Ser. No. 661,918, filed Aug. 21, 1967. In the aforesaid invention the upper slide carrying the die also moves downwardly by gravity, but there the slide carried with it the tension rods or pull rods which were secured at their upper ends to adjusting means mounted on the upper slide. Thus the moving parts in that machine included not only the upper slide and the die mounted thereon but also the pull rods and the adjusting mechanism for the rods mounted on top of the moving slide.

As distinguished therefrom, the present invention eliminates much of the weight which had to be moved in the previous device, such as the pull rods and the adjusting mechanism therefor, whereby less energy is required to elevate the slide and move it upwardly to its uppermost position.

In the present form of the invention, the tension rods are fixed except for the fact that they may be adjusted to suit different die heights. Once the rods are adjusted for a given set of dies, however, they remain fixed so that the upper slide will move upwardly and downwardly with respect thereto. Furthermore, the adjusting mechanism whereby the tension rods may be moved upwardly or downwardly to suit various die heights is located below the press bed in the present design so that the only part of the press which needs to be raised and lowered is the upper slide and the die mounted thereon.

In view of the foregoing it is therefore one of the principle objects of the present invention to provide a vertical injection molding machine in which the weight carried by the slide is minimized, thereby reducing the horse power requirement in returning the slide to its upper position in a given period of time.

Another and specific object of the invention is to minimize the weight carried by the slide by eliminating the adjusting mechanism for the rods from the slide itself and mounting such mechanism below the press bed.

A further and more specific object of the invention also is to minimize the weight carried by the slide by mounting the tension rods in the clamp units below the press bed so that they need not be raised and lowered with the slide itself.

Other and more specific objects of the invention will appear more fully hereinafter from the following description, taken in conjunction with the accompanying drawings, in which:

FIG. 1 is a front elevational view of a vertical injection molding machine embodying the present invention partly in section to show some of the details thereof and illustrating the slide in its uppermost position;

FIG. 2 is a fragmentary view of a part of the machine similar to FIG. 1 but showing the slide in its lowermost position where the die members are closed;

FIG. 5 is an enlarged fragmentary view partly in section and partly in elevation showing in greater detail one of the clamping units and the adjusting mechanism for the rod therein, and FIG. 6 is a view similar to FIG. 5, but showing a modified form of the clamping unit.

DETAILED DESCRIPTION

Figure 3:
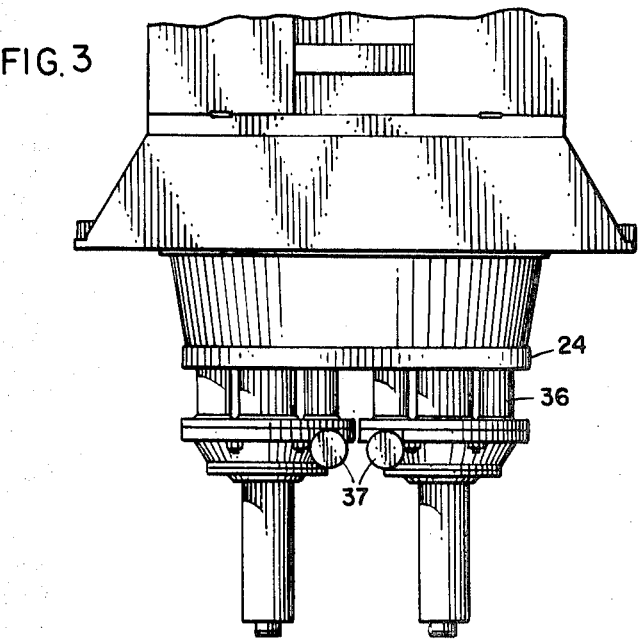
FIG. 3 is a fragmentary end elevational view at the bottom of the machine showing the clamping units below the press bed.

Referring now more particularly to the drawings, the machine is generally shown in FIGS. 1 and 2 wherein the spaced side members or uprights 10 and 11 form the sides of the machine. A crown 12 at the top thereof spans the aforesaid side members or uprights. Between the uprights 10 and 11 and preferably at floor level, there is provided a bed 13 adapted to have a suitable stationary die member mounted thereon. An upper slide 14 is mounted for vertically reciprocating sliding movement between the side frame members or uprights on which an upper movable die member is adapted to be mounted. The upper slide 14 is guided in its reciprocating movement by suitable guide means such as gibs 15.

The die members, which are not shown, will of course assume different configurations and designs, depending upon the size and shape of the part to be molded. When the upper slide is lowered so that the upper and lower die members are brought together, there will be a die cavity therebetween into which the molten material is injected.

A plurality of tension rods 16 are positioned so that the lower end of each rod extends downwardly through the machine frame and into a clamping unit while the upper end of each rod extends upwardly through the upper slide.

The upper slide 14 includes a bottom late member 17, a top plate member 18 and end walls 19 and 20. Inner walls 21 at each side of the machine are spaced inwardly from the end walls 19 and 20 respectively thereby providing chambers 22 at opposite sides of the frame into which the tension rods 16 extend.

As will be pointed out in greater detail hereinafter, there is provided a plurality of clamping units, one for each tension rod. These clamping units are indicated generally by the numeral 23, each of which is secured to the underside of a bottom plate 24 of the machine frame as shown particularly in FIGS. 1, 2 and 3.

Each of the tension rods 16 is provided at its upper end with an enlarged head 25. The top plate member 18 of the upper slide is open, as at 26, to enable the enlarged heads of the tension rods to pass to a position above the slide when it is moved downwardly to its lower position. The upper slide is also provided with a plurality of locking latches, one latch for each of the tension rods 16. Each latch member consists of a pair of arms adapted to move toward and away from each other, the inner edges of these arms being arcuate so that when they are moved toward each other to clamping position, they will snugly embrace a tension rod 16.

The design of these locking latches is similar to that disclosed in our above-referred to earlier filed copending application and the operation thereof is the same as explained therein. For the purposes of this case, it is sufficient to note that these arms 27 and 28 are actuated by suitable hydraulic means. When the upper slide has been moved downwardly to its lower position as shown in FIG. 2 where the head 25 of each of the rods has passed through the opening 26, the latches 27 and 28 are moved toward each other to their locking position immediately below the head 25. As will be pointed out more fully hereinafter, the clamping units 23 at the bottom of the press will then be hydraulically actuated to pull downwardly on each of the rods and to exert an upward force on the press bed thereby to clamp the two die members together.

The lower end of each of the tension rods 16 has a threaded portion as indicated by the numeral 29. This portion of each rod threadedly engages an adjusting nut 30 within each of the clamping units 23. As may be seen more clearly by reference to FIG. 5, the adjusting nut 30 is fastened by the key 31 to the worm gear 32 so that rotation of said worm gear will likewise rotate the adjusting nut 30.

A worm 33 engages the worm gear 32 and is adapted to have a suitable and well-known drive mechanism which is adapted to rotate the worm 33 thereby rotating the worm gear and adjusting nut 30. This specific construction is well known in the art and has been used heretofore for the purpose of adjusting the positions of tie rods and the like in presses.

A spined shaft 34 engages a splined ring 35 secured to the lower end of each of the tension rods 16 thereby holding the rod against rotation when the adjusting nut 30 is rotated. Thus it will be evident that when the worm 33 is rotated to actuate the adjusting nut 30, the rod will move upwardly or downwardly with respect to the adjusting nut depending upon the direction in which it is rotated.

Inasmuch as the height of the dies will vary depending upon the particular product being made, the upper slide and the die mounted thereon may moved downwardly different distances. Thus, for a given die height each of the tension rods 16 will be adjusted upwardly or downwardly a suitable distance so that the head 25 of each rod will extend upwardly a short distance beyond the upper part of the slide when the dies are in closed position regardless of the height of those dies.

Each of the clamping units 23 is provided with a clamp cylinder 36 mounted on the underside of the plate 24 and which is secured to the lower part 37 of the clamp unit housing by means such as the bolts 38.

A piston 39 is positioned in each clamping unit between the adjusting nut 30 and the clamp cylinders 36 as may be clearly seen in FIG. 5. Suitable sealing members 40 and 41, held in their respective positions by rings 42 and 43 respectively, seal the adjacent surfaces of the clamp cylinder 36 and the piston 39 against the leakage of hydraulic fluid. The piston 39 is adapted for movement axially of the associated tension rod 16 for a purpose which will presently be seen.

Hydraulic fluid inlet passages 44 extend through the clamp cylinder 36 and communicate with the annular space 45 between the piston and cylinder. Another annular space 46 is provided between the piston and the clamp cylinder adjacent the bottom thereof and communicates with hydraulic fluid ports 47.

In FIG. 5 the piston 39 is shown in its normal unactuated position which it occupies when the slide and upper die are in the uppermost position. When the dies are in contact and the locking latches have closed upon the upper end of each of the tension rods below the head 25 thereof, and it is desired to place the die members under pressure, hydraulic fluid is caused to enter the passages 44 under pressure and the fluid in the annular space 46 is then vented through the ports 47 whereupon the piston 39 is urged downwardly to the power position thereof shown by the dotted lines in FIG. 5.

Downward movement of the piston 39 will cause a like downward movement of the adjusting nut 30 which will thereby stretch the associated rod 16 and place it under tension. It is evident that the adjusting nut 30 may be permitted to move downwardly with respect to the associated worm gear 32 by reason of its keyed connection therewith. It will also be evident that the fluid under pressure in the annular space 45 will exert an upward pressure on the clamp cylinder 36 and against the presss bed so that the downward pull of the rods and the upward pressure of the bed will clamp the two die members together. They are thus clamped in this position until the injection and molding process has been completed whereupon a reverse flow of the hydraulic fluid takes place and the parts are returned to their normal position. When the tension has thus been relieved, the locking latches 27 and 28 will be moved away from each other to release the rod whereupon the upper slide will be returned to its uppermost position and the molded part removed.

As stated hereinbefore, the upper slide is caused to move in a vertical direction by the action of a plurality of lift cylinders. Referring once again to FIGS. 1 and 2, a plurality of hydraulic cylinders 48 and associated pistons 49 are provided the upper ends of which are connected to the slide. Hydraulic fluid under pressure flowing into the cylinders 48 will lift the pistons 49 and elevate the slide. When a molding cycle is to begin, the hydraulic fluid is exhausted from the cylinders 48, thereby allowing the pistons 49 and the slide connected therewith to move downwardly by gravity.

Figure 4:
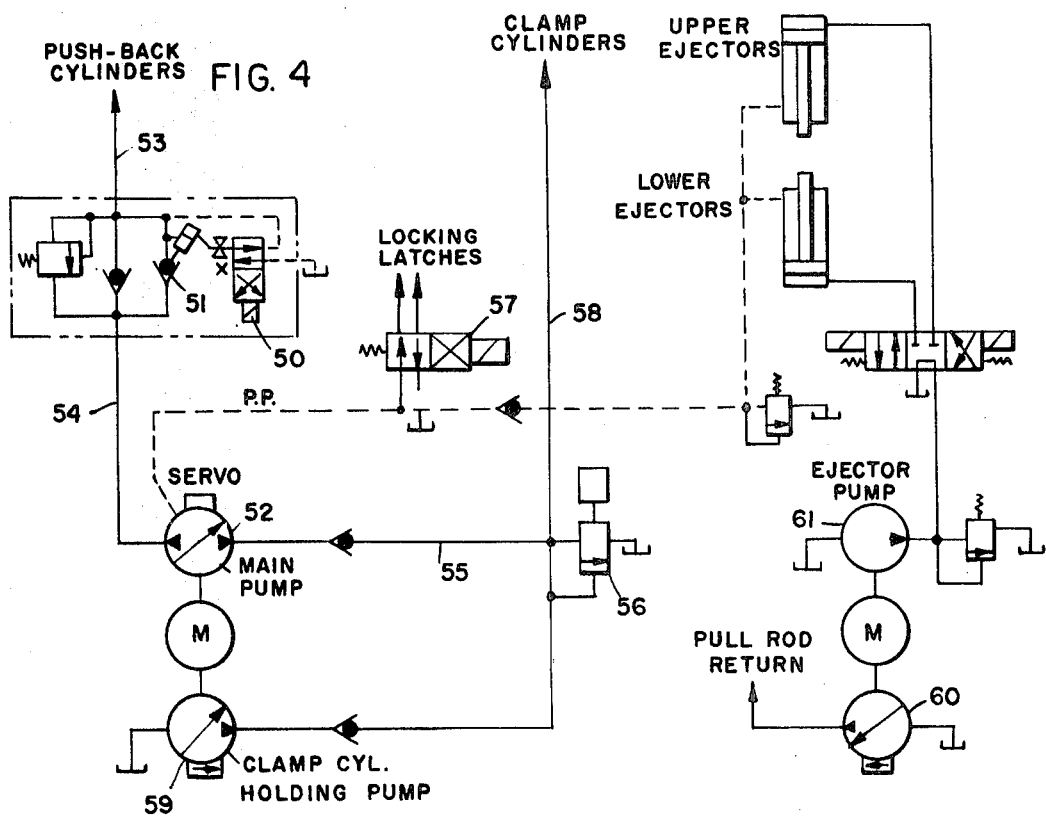
FIG. 4 is a schematic illustration of the hydraulic circuitry for operating the machine in a predetermined sequence.

An understanding of the manner in which the press is cycled may be had by referring to FIG. 4 which shows schematically the hydraulic system. The condition of the system in FIG. 4 is with the slide in its uppermost position just prior to the beginning of the cycle. Initially, the solenoid 50 will be energized to open valve 51 and simultaneously operate the main pump 52. Thereupon fluid will flow out of the pushback cylinders through the conduit 53 and valve 51, through conduit 54 and will be pumped through the line 55 and then will flow either through the relief valve 56 or through a suitable and separate dump valve.

The setting of the pump will determine the speed of movement of the slide. The pump may be of any suitable and well-known design which is adjustable to regulate the rate of flow of fluid therethrough. The pump can be set for any delivery rate from zero on up. Suitable means may be provided so that as the upper slide nears the lower die, the pump is automatically regulated to slow down the movement of the slide. The slide will be slowed until it stops against the lower die and the mold closes.

When the mold is closed, the locking latches 27 and 28 will then be closed by operation of the solenoid operated valve 57. After the locking latches are in position, hydraulic fluid is then pumped by the main pump through the conduit 58 to the clamp cylinders, thereupon building up the pressure to put the rods 16 under tension. The clamp cylinder holding pump 59 also operates to pump fluid to the clamp cylinders and the pressure is then built up to a predetermined amount which is determined by the relief valve 56. When such predetermined pressure is reached, the main pump 52 will return to neutral and the holding pump 59 will maintain the pressure until the injection process has been completed.

At the completion of the injection process, de-compression may then take place, either through a separate decompression valve or through the relief valve 56. This will relieve the pressure on the tension rods, however, these rods must also be positively moved and this is done by a small pressure compensated pump 60 which is always on and moves the rods when the pressure is relieved. At this point then, operation of the valve 57 will open the locking latches and the pumping of the fluid in the reverse direction through conduit 54 will then return the slide to its uppermost position. This is, of course, accomplished by setting the main pump to display the fluid back into the pushback cylinders. During upward movement of the slide, the slide ejectors may be operated in the usual and well-known manner by operation of an ejector pump 61.

It is thus apparent that the present construction has numerous advantages over constructions heretofore known and may be operated by the use of less power than that required for the construction shown in our above-referred to copending application. This, of course, is due to the reduced weight which is carried by the upper slide, mainly, the tension rods and the adjusting mechanism therefor.

FIG. 6 illustrates a modified form of construction of the clamp cylinders for placing the rods under tension and for holding the die parts together during the injection process. In this figure, the tension rod is again indicated by the numeral 16 and the threads thereon by the numeral 29. The adjustment, likewise, may be made through the medium of the worm 33 and worm gear 32. Also the splined shaft 34 engages a splined ring 35 to prevent the tension rod from rotating while it is being adjusted.

In this modified form of the invention, the adjusting nut is indicated by the numeral 62 and, as before, threadedly engages the lower end of the tension rod 16. The nut 62 is connected with the worm gear 32 by means of the key 63. The clamp cylinder 64 is again secured to the underside of the plate 24, and the piston 65 is positioned therein for axial movement. In this design, the piston 65 has the upper end thereof extending through the plate 24 and engages a fixed ring 66 through the medium of the key 67. This allows for axial movement of the piston with respect to the plate 24 in the same manner as the key 63 permits axial movement of the adjusting nut 62 with respect to the worm gear 32.

A counterbalance cylinder 68 is secured to the housing of the clamping unit and extends downwardly therebelow as illustrated. This cylinder may contain a fluid, either oil or air, which is placed into the cylinder through inlets 69. A piston member 70 is threadedly mounted on the lower end of the tension rod 16 so that as the rod is moved downwardly under hydraulic pressure, the piston 70 will likewise move downward against fluid pressure for the counterbalancing action. If hydraulic fluid is used, then pressure of the downwardly moving piston 70 will force the fluid out through the openings 69. If air is the fluid, then the mere compression of it will act as the counterbalancing factor.

As in the first described form of the invention, the cylinder 64 is provided with inlet passages 71 which communicate with the annular space 72 so that when fluid under pressure is forced therein, the piston 65 will move downwardly carrying with it the nut 62, the rod 16 and the piston 70 against the fluid pressure in the counterbalance cylinder. The annular space 73 below the piston 65 is provided so that the piston may move downwardly to the dotted line position thereof as illustrated.

It thus may be seen that in this modified form of the invention, it is unnecessary to provide for outlets for the hydraulic fluid from the annular space 73 below the moving piston. The fluid in the counterbalance cylinder will take the place of such a construction.

It will be noted, however, that in both forms of the invention, neither the tension rods nor the adjusting mechanism therefor, is mounted on the upper slide, thereby reducing the weight thereof considerably and necessitating less power to return the slide and die mounted thereon to its uppermost position. Furthermore, such reduced weight will permit faster operation and a shortening of the time required for the machine to cycle.

Changes may be made in the form, construction and arrangement of parts from those disclosed herein without in any way departing from the spirit of the invention or sacrificing any of the attendant advantages thereof, provided however, that such changes fall within the scope of the claims appended hereto.

The invention is hereby claimed as follows:

1. A vertical injection molding machine comprising:
   (a) an upper slide adapted to have an upper die member mounted thereon and movable between upper and lower positions,
   (b) a plurality of lift cylinders having pistons therein attached to said upper slide and adapted
      (1) to elevate said slide to the upper position thereof under hydraulic pressure, and
      (2) to permit said slide to move downwardly to the lower position thereof when the hydraulic pressure is relieved,
   (c) a bed adapted to have a lower die member mounted thereon to cooperate with the upper die member when said slide is in the lower position thereof to form a die cavity therebetween into which a fluid moldable substance may be injected,
   (d) a plurality of clamping units mounted on the underside of said bed,
   (e) a like plurality of tension rods, each having its lower end secured within a clamping unit and its upper end extending into said upper slide,
   (f) said rods remaining fixed during movement of said upper slide to the lower position thereof,
   (g) cooperating means on said upper slide and on each of said rods to lock said slide against upward movement when in the lower position thereof, and
   (h) means to actuate each said clamping unit upon the introduction thereinto of hydraulic fluid to exert downward pressure directly on the lower end of the rod and located within said clamping unit and upward pressure on said bed, thereby to clamp the upper and lower die members together during injection of the fluid moldable substance into the cavity therebetween.

2. A vertical injection molding machine as defined in claim 1, including means in each of said clamping units to adjustably secure the lower end of the tension rod associated therewith.

3. A vertical injection molding machine as defined in claim 1, wherein each of said clamping units includes an adjusting nut threadedly engaging the lower end of its associated tension rod, means for rotating said nut with respect to said rod, thereby to adjust said rod axially, and means mounting said nut for axial movement with said rod upon the introduction thereinto of the hydraulic fluid.

4. A vertical injection molding machine as defined in claim 3, including a piston above said adjusting nut, means for introducing the hydraulic fluid under pressure into said unit above said piston, thereby to urge said piston nut and rod downwardly, and fluid means to urge said piston upwardly upon completion of the molding cycle and relieve the tension on said rod.

5. A vertical injection molding machine as defined in claim 4, wherein said last named means includes an annular space below said piston, and means for introducing hydraulic fluid into said space while relieving the hydraulic pressure above said piston.

6. A vertical injection molding machine as defined in claim 4, wherein said last named means includes as cylinder mounted below said clamping unit having a fluid under pressure therein, and a second piston within said cylinder secured to the lower end of said rod.

References Cited

FOREIGN PATENTS 1,443,277   5/1965   France _____ 18—30LV

J. SPENCER OVERHOLSER, Primary Examiner

L. R. FRYE, Assistant Examiner